April 26, 1938.  P. L. TENNEY  2,115,089
POWER TRANSMISSION CONTROL MECHANISM
Filed July 17, 1936 4 Sheets-Sheet 2

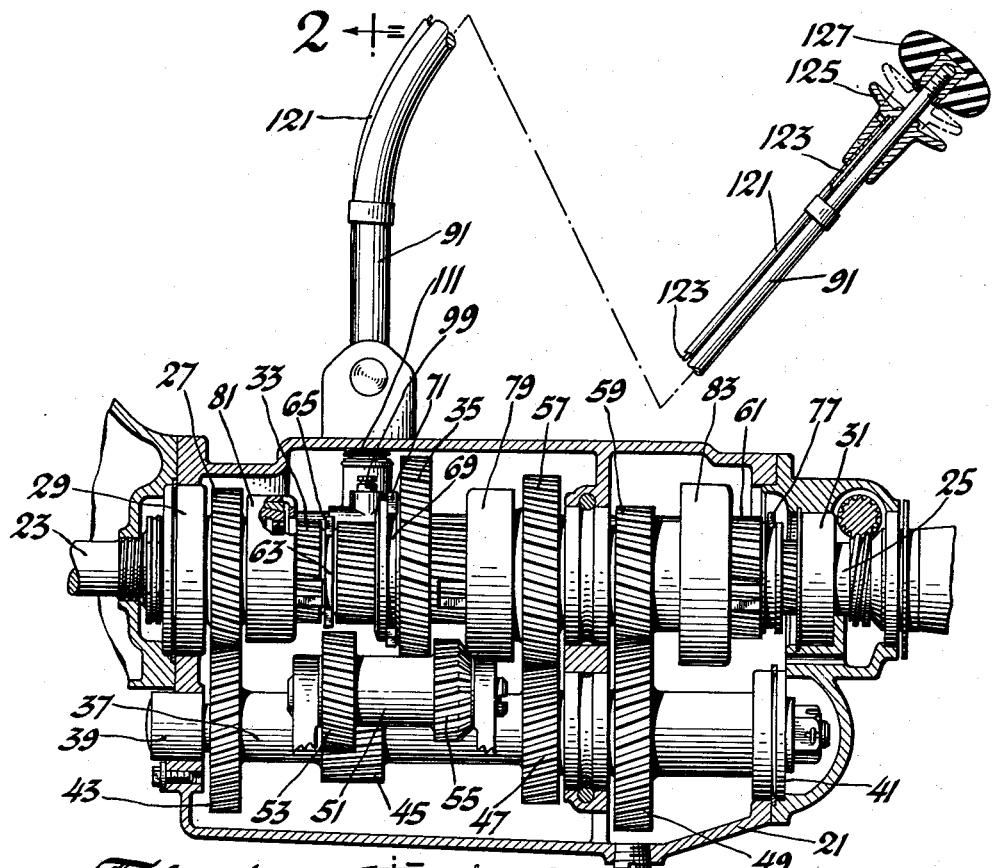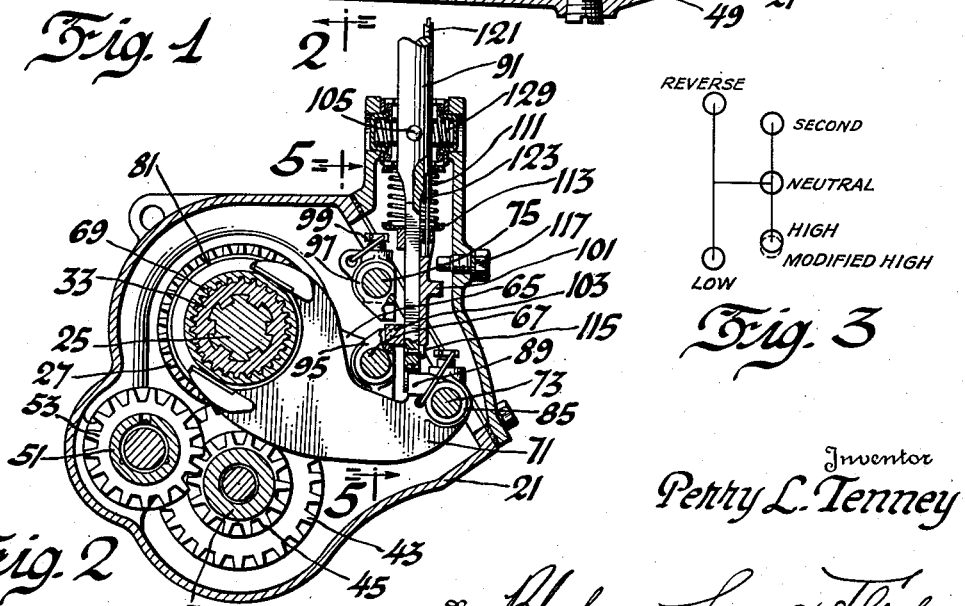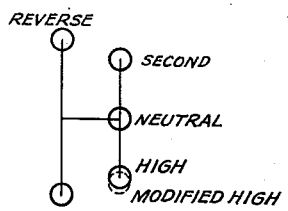

Inventor
Perry L. Tenney
By Blackmore, Spencer & Flint
Attorneys

April 26, 1938.   P. L. TENNEY   2,115,089
POWER TRANSMISSION CONTROL MECHANISM
Filed July 17, 1936   4 Sheets-Sheet 3
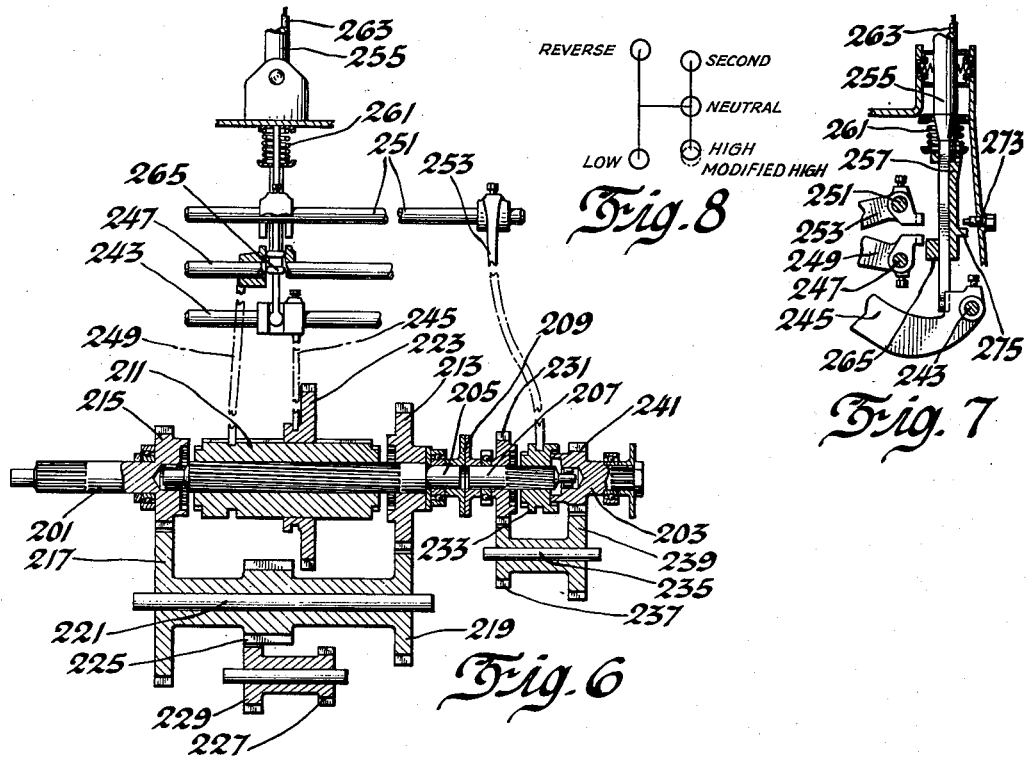
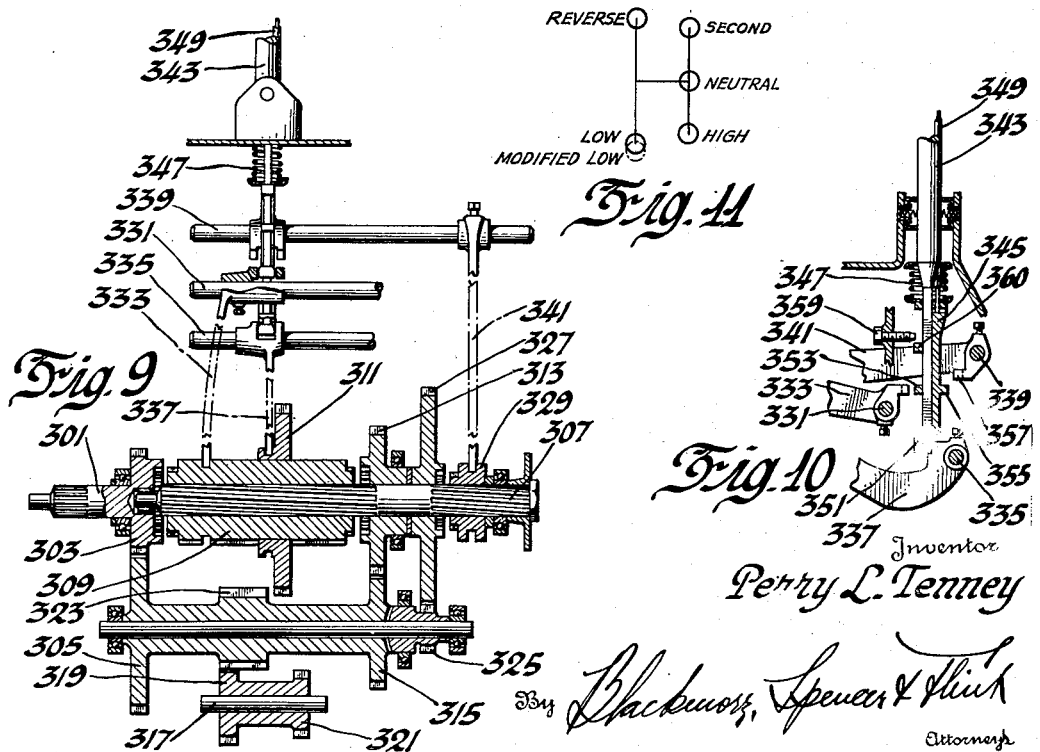
Inventor
Perry L. Tenney

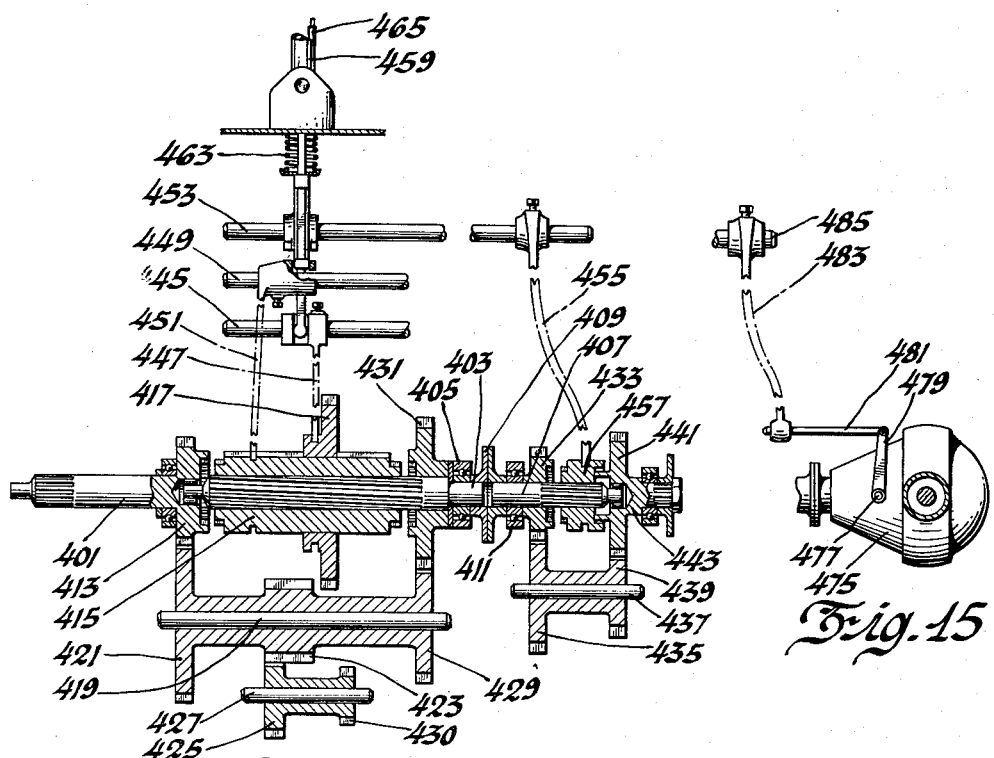
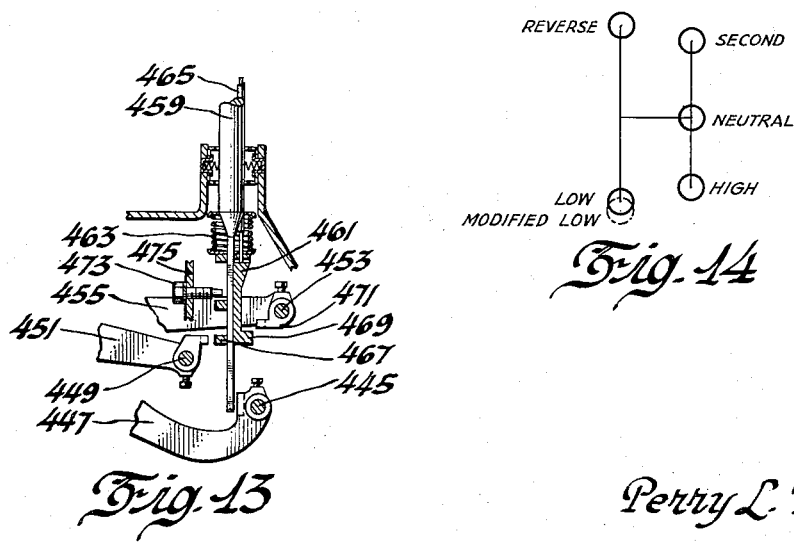

Patented Apr. 26, 1938

2,115,089

UNITED STATES PATENT OFFICE 2,115,089

POWER TRANSMISSION CONTROL MECHANISM

Perry L. Tenney, East Lansing, Mich., assignor to General Motors Corporation, Detroit, Mich., a corporation of Delaware Application July 17, 1936, Serial No. 91,073

1 Claim. (Cl. 74—473)

This invention relates to a ratio changing transmission designed particularly for use on vehicles. More especially the invention is concerned with the arrangement for shifting gears and clutches to afford four forward speeds.

An object is to provide the conventional shift lever positions for the usual three forward speed and reverse ratios and additional means whereby the lever may render active the added ratio, the movement of the lever being determined by the character of the new ratio. Where the the added ratio is one somewhat higher than the conventional high, the lever is moved from its neutral position in the same way as if to shift to high, the modified high being secured by raising a finger grip on the lever. If the added ratio is a modified low, the shift lever is moved in the direction of shift to conventional low, but here again the finger grip is raised to reach the "sub-low" position. In each case a suitable stop device is used to prevent accidental and unintended shift into the supplementary driving ratios.

Associated with the major object stated above are secondary objects such as simplicity in construction and economy in manufacture.

Other objects and advantages will be understood from the following description.

Fig. 1 is a vertical longitudinal section through one form of a four-speed transmission.

Fig. 2 is a transverse section on line 2—2 of Fig. 1.

Fig. 3 is a diagram of the shift lever positions.

Fig. 6 is a longitudinal section, partly diagrammatic, of a second form of the invention.

Fig. 7 is a detail of the shift lever and forks used in the arrangement of Fig. 6.

Fig. 8 is a diagram of shift lever positions for this second embodiment.

Fig. 9 is a longitudinal section, partly diagrammatic, of a third embodiment.

Fig. 10 is a detail of the shift lever and forks used in this third form.

Fig. 11 is a diagram showing the shift lever positions used in this third form.

Fig. 12 is a view in longitudinal section of a fourth embodiment.

Fig. 13 is a detail of the shift lever and forks.

Fig. 14 is a diagram of the lever positions.

Fig. 15 is a view in side elevation of a further modification.

Figure 4:
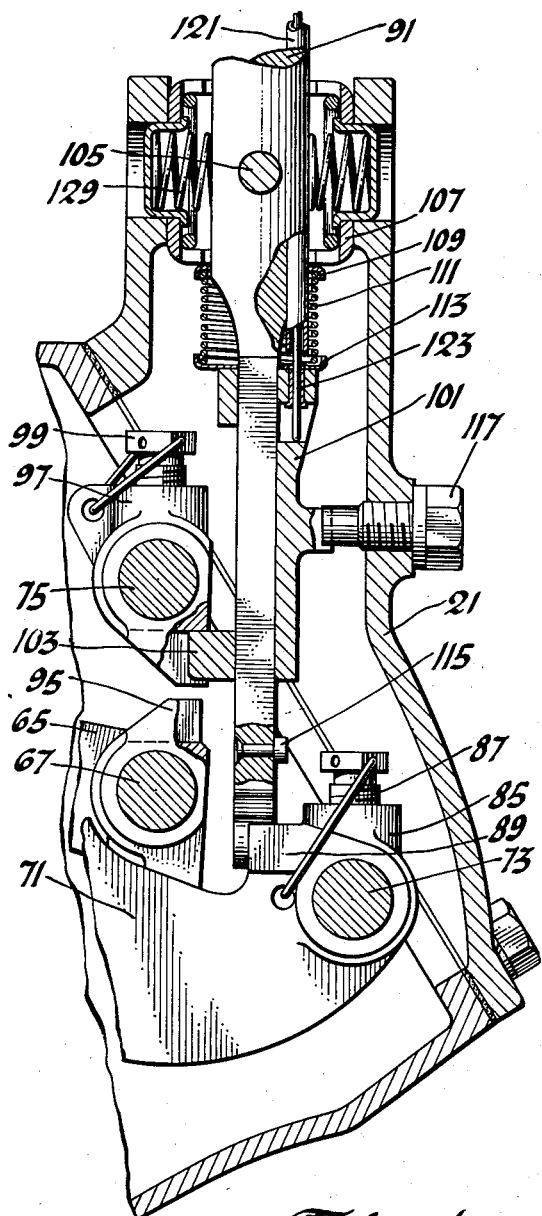
Fig. 4 is a view like Fig. 2 but on a larger scale and with parts in changed positions.
Figure 5:
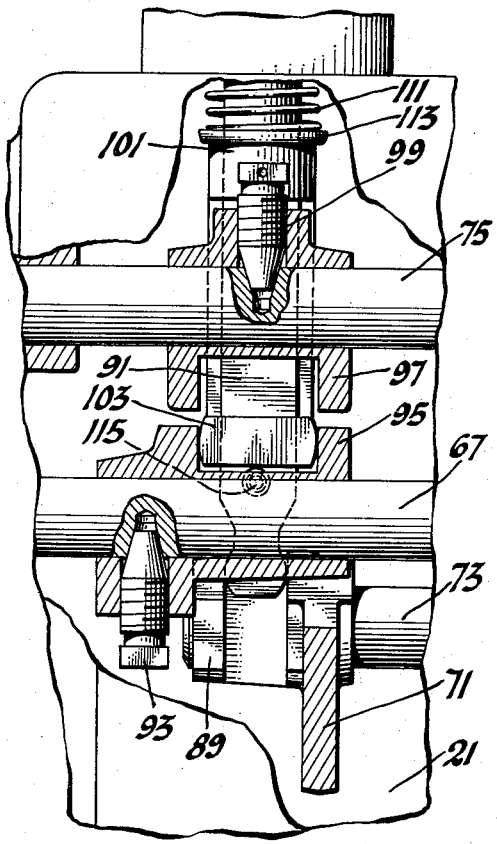
Fig. 5 is a section on line 5—5 of Fig. 2.

Referring to Figs. 1 to 5, a casing 21 houses the change speed gearing. This gearing includes an input shaft 23 and an output shaft 25. The input shaft carries a gear 27 in the casing adjacent the shaft bearing at 29 in the casing wall. The output shaft extends through a bearing 31 at the rear of the casing and is in alignment with input shaft 23. It extends to the end of the input shaft adjacent gear 27 and may be piloted therein if desired as is usual. Slidably splined on shaft 25 is a clutch sleeve 33 and slidably splined on sleeve 33 is gear 35.

A countershaft 37 is supported by end bearings 39 and 41. Shaft 37 carries a gear 43 in constant mesh with gear 27. It has also a gear 45 and a gear 47. An additional gear 49 is also mounted on the countershaft.

A suitably journaled reverse idler shaft 51 has gears 53 and 55.

Freely rotatable on shaft 25 are gears 57 and 59. The driven shaft and countershafts have additional bearing support between gears 57 and 59 and between gears 47 and 49, respectively. Also slidably splined on shaft 25 is a clutch 61.

Sleeve 33 is provided with a collar 63 engaged by a fork 65 secured to a reciprocable rail 67. Gear 35 has a similar collar 69 to receive a fork 71 carried by rail 73. A third rail 75 extends to the rear of the casing and carries a fork 77, the arms of which enter a collar in clutch 61.

The operation to secure the several ratios may be briefly described. Gear trains 27—43, 47—57 and 49—59 are constantly rotating. So also is gear train 45—53. If rail 73 is reciprocated to slide fork 71 to bring gear 35 into mesh with gear 45 low speed results, the drive being through gear train 27—43 and 45—35. The drive is obtained since 35 is splined to sleeve 33 and because sleeve 33 is splined to driven shaft 25. An opposite reciprocation of rail 73 from its neutral position brings gear 35 into mesh with gear 55 to effect reserve driving. The effective gear trains are 27—43, 45—35 and 55—35.

Second speed is obtained by reciprocating rail 67 toward the rear. In doing so fork 65 carries sleeve 33 rearwardly and its rear end teeth are engaged with teeth not shown on gear 57. These teeth are concealed by the synchronizing cone 79. This construction is well known and needs no illustration. Second speed drive is then operating through gear trains 27—43 and 47—57, gear 57 now being locked against rotation on shaft 25.

Conventional high or direct speed is obtained by reciprocating rail 67 toward the front so that the clutch teeth at the front end of sleeve 33 engage cooperating clutch teeth on the input shaft concealed by the synchronizing cone 81. The input and output shafts are then rotating in unison.

If the rails 67 and 73 be held in their neutral positions and if rail 75 is reciprocated forwardly, its fork 77 will move clutch 61 forwardly so that its teeth lock with teeth on gear 59, the last-named teeth being concealed within the synchronizing cone 83. The output shaft is driven because clutch 61 is mounted non-rotatably on shaft 25 and the drive will be through gear trains 27—43 and 49—59. The gear sizes are such that shaft 25 rotates faster than input shaft 23.

In designing a change speed mechanism having this modified high ratio, it is desirable that the movements of the operating lever for the low, second and high should be the same as the conventional movements for these ratios and that the movement for modified high be merely a similar movement in the same direction as that for high speed, that this shift be normally locked out but available by the actuation of a conveniently located latch mechanism. To that end I have made the arrangement next described.

Three rails 75, 67, 73 are grouped preferably at one side of the housing and carry lugs for engagement with the actuating lever. Fork 71 for low and reverse ratio is secured to rail 73 by screw 87 and carries a lug 85, the lug being bifurcated at 89 to receive the extreme end of operating lever 91. Fork 65 is secured to rail 67 by fastening screw means 93 and its bifurcated lug is seen at 95. Fork 65 is for shifts to second and high. Rail 75 for modified high has a lug 97 secured by fastening means 99. Slidable on lever 91 is a sleeve latch 101 having a lug 103 adapted to engage either between the furcations of lug 95 or between the furcations of lug 97. When the sleeve is in its lower position its lug 103 may engage 95. When in its upper position it may engage 97. On the housing 21 just below the pivot pin 105 of lever 91 is a cup 107 engaged by an abutment 109 for a spring 111, the spring engaging a lower abutment 113 the latter contacting the upper end of sleeve 101. The spring thus normally holds the sleeve in its lower position where it engages a stop 115 on the lever 91. The casing has a screw-threaded stop 117 to prevent the upward movement of the latch except when lug 103 is positioned to engage lug 97. Alongside the shift lever 91 is secured a tubular casing 121 for a reciprocating rod 123. The latter is operably connected at its lower end to sleeve 101 and its upper end to a finger grip 125 located below the knob 127 of the lever. By this means the latch sleeve is moved up so that its lug 103 may occupy the position shown by Fig. 4. Associated with pivot 105 are conventional means designated as a whole by numeral 129 whereby the lever may be swung both fore and aft and transversely and held resiliently.

The operation of the shift lever may be briefly described. When the transmission is in neutral position the sleeve 33 is in its mid position, neither clutched to the input shaft nor clutched to gear 57. Gear 35 is out of mesh with low speed driver 45 and reverse driver 55. Overgear clutch 61 leaves gear 59 disconnected from the output shaft. The shift lever 91 may be in the position shown by Fig. 2 where spring 111 has pushed down the latch 101. If it be desired to start by operating in reverse, the knob end of lever 91 is moved transversely toward the operator—toward the left—to engage the end of the lever with rail 73 and then longitudinally forward whereby the fork 71 is moved backward and gear 35 meshes with gear 55. If then one wishes to drive forward, the knob end is drawn backwardly without transverse movement. In doing so the rail 73 and fork 71 move forwardly and gear 35 engages countershaft gear 45. To step up to second speed, the knob end of the lever 91 is returned to neutral, rocked to the right and pushed forwardly. In doing this rail 73, fork 71 and gear 35 are restored to their mid positions where gear 35 takes no part in the drive. The transverse movement of the lever causes lug 103 of the sliding latch to engage the lug 95 associated with rail 67 and fork 65. The forward movement of the knob end causes a rearward movement of the fork 65. This slides the clutch sleeve 33 to the rear and locks gear 57 non-rotatably to the driven shaft whereby second speed is obtained. This action is made silently by means of the synchronizing device 79. By a rearward movement of the lever with no transverse movement through the conventional H slot, sleeve 33 is clutched to the input shaft for normal high speed. Synchronizing device 81 ensures a silent engagement. To secure overgear through gears 49—59, the lever 91 is moved back to neutral, hand grip raised to lift lug 103 on sleeve 101 from rail 67 and into engagement with lug 97 on rail 75. A rearward movement of the lever now effects no movement of rail 67 whereby clutch sleeve 33 remains idle. However, this movement does move the rail 75 forwardly and by means of fork 77 it clutches gear 59 to the output shaft whereby gear train 49—51 drives the output shaft faster than the input shaft. In this operation synchronizer 83 prevents clash. This is accomplished while retaining the conventional shifting movements. Substantially all the driver does in deciding to go to overgear instead of to normal high is to lift the hand grip before he starts the forward movement of the lever.

Figs. 6, 7 and 8 show an arrangement having the same sequence of lever movements to obtain the usual three forward speeds and an overspeed ratio but designed for use with a modified transmission, one wherein the clutch for normal high is also engaged when driving in modified high.

In this embodiment the input shaft is marked 201 and the output shaft 203. An intermediate shaft is shown as formed of two parts 205 and 207 united by a coupling 209. The several shafts are in alignment, are piloted the one in the other and are supported on suitable bearings. Clutch sleeve 211 is slidably splined on shaft 205 and if moved to the left may be clutched to the input shaft in the usual way for direct drive. If moved to the right it may serve to lock gear 213 to shaft 205. Second speed of shaft 205 may then be obtained from gear 215 on the input shaft through gear trains 215—217 and 219—213, gears 217 and 219 being on countershaft 221. Gear 223 is slidably splined to sleeve 211 and may engage gear 225 on the countershaft for low speed driving of shaft 205. For driving in reverse, it may be engaged with gear 227 of a double reverse idler, the other gear 229 of which is in constant mesh with gear 225.

Shaft 207 which is coupled to shaft 205 carries a loosely mounted gear 231 and a splined clutch 233, the clutch 233 normally directly engaged to clutch teeth on output shaft 203. This engagement causes shaft 203 to rotate jointly with 205 and 207 and when so engaged the transmission operates like the three speed mechanism of Fig. 1. To obtain the overdrive with this form of mechanism, the clutch 233 must be disconnected from the output shaft 203 and engaged with gear 231. A lay shaft 235 is formed with two gears one, 237, in constant engagement with gear 231 and the other, 239, in constant engagement with gear 241 on the output shaft. It will be seen that to secure the overdrive through gear trains 231—237 and 239—241 the clutch 211 must be connected for direct drive, that is to say sleeve 211 must be in its left end position.

This change from the arrangement of Fig. 1 makes necessary a change in the lever operating mechanism. Rail 243 and fork 245 control the reciprocation of gear 233 to make the shifts into low and reverse in a way which will be understood. Rail 247 and fork 249 serve to shift clutch sleeve 211 for second speed and normal high. Rail 251 and fork 253 serve to shift clutch 233.

Lever 255 carries a sleeve latch 257 positioned by a spring 261 and adapted to be raised by a rod 263 as in the case of the form first described. The end of lever 255 engages fork 245 to make low speed and reverse shifts. While sleeve 257 is down the lever may be rocked transversely and its lug 265 may engage fork 249 and reciprocate the same to make shifts into second speed and normal high. The rod 263 may be manually operated to cause lug 265 to engage a lug on rail 251. When so engaged, it also engages the lug on fork 249. Longitudinal movement then reciprocates both forks 249 and 253, the former to slide sleeve 211 to directly drive shaft 207 from shaft 201 and the latter to shift clutch 241 to drive output shaft 203 from shaft 207 through step-up gear trains 231—237 and 239—241. It will be apparent, therefore, that here as before the movements of the lever 255 to make shifts to and from low, reverse, second and normal high are the same as is now conventional in transmissions providing three forward speeds and one reverse speed. Also, that to get the overspeed ratio the shift is to neutral and then as before in the direction of normal high speed but with the latch sleeve 257 raised so that both forks 249 and 253 are moved simultaneously. In this form of the invention a stop 273 cooperates with a lug 275 to prevent the upward movement of the sleeve 257 except when its lug 265 is positioned for engagement with the lug on rail 251.

In some vehicles it is advisable to modify the conventional three-speed transmission by adding a sub-low ratio to give added power. The present invention contemplates equipping such a transmission with a lever and shift mechanism such that the shifts to and from reverse, low, second and high shall be made by the now generally used movements of the lever and that the movement to modified low is made from neutral in the direction of normal low subsequent to the lifting of a sleeve on the shift lever by a finger grip as in the shifts to overgear in the forms already described. Figs. 9, 10 and 11 illustrated such an embodiment of the inventive idea.

The transmission is essentially like that of Fig. 1, differing in providing a step-down additional ratio below normal low instead of a step-up above normal high. Input shaft 301 carries a gear 303 in constant mesh with countershaft gear 305. Driven shaft 307 is piloted in the end of shaft 301. Slidably splined on shaft 307 is a sleeve clutch 309, slidably splined on which is a low and reverse driven gear 311. Loosely mounted on shaft 307 is a second speed driven gear 313 in constant engagement with fixed countershaft gear 315. Idler shaft 317 has gears 319 and 321. Gear 319 is constantly driven by countershaft gear 323. Gears 323 and 321 may be engaged with gear 311 when the latter is reciprocated in one direction or the other. The countershaft has an additional small gear 325 in mesh with a gear 327 loosely mounted on driven shaft 307. Gear 327 may be locked from rotation relative to shaft 307 by a forward movement of a clutch 329.

The operation to effect the several ratios will be obvious. A forward movement of clutch sleeve 309 causes the driven shaft 307 to rotate in unison with the input shaft. Rearward movement effects second speed because the clutch 309 locks gear 313 from rotation relative to the output shaft, the latter being driven through gear trains 303—305 and 315—313. These shifts are made by fore and aft movements of the shift rail 331 by means of fork 333. Shifting into low and reverse is made by fore and aft movements of the lowest rail 335 and its fork 337. The operation is the same as described above and need not be repeated. Shift into modified low is made when the above mentioned parts 309 and 311 are in their neutral non-driving position. To obtain modified low, clutch 329 is shifted forwardly to lock gear 327 from rotation relative to shaft 307. This is accomplished by reciprocation of the upper rail 339 and its fork 341, which latter engages the clutch 329.

The modification of the parts associated with the shift lever 343 is shown by Fig. 10. The lever 343 carries a latch sleeve 345 normally held downwardly by a spring 347 but adapted to be pulled up by a rod 349. When the sleeve 345 is down the lever may be rocked in the usual transverse direction for reverse and low shifts. A lug 351 on the sleeve 345 then engages rail 335 and fork 337. Fore and aft movements slide the gear 311 for reverse and low speed. An opposite transverse movement of the lever 343 brings another sleeve lug 353 into operative relation with rail 331 and fork 333. Fore and aft movements of the lever then move the clutch sleeve to second speed and high speed positions. When the lever is in neutral and it is desired to shift into modified low, the latch sleeve 345 is pulled up so that lug 351 is raised above its position for engagement with rail 335. Another lug 355 is brought into operative engagement with a lug 357 on rail 339 when the lever is rocked transversely in the same way as it is rocked for normal low. A stop screw 359 by engagement with a lug 360 prevents this upward movement when the lug 355 is out of position for engagement of parts 355 and 357. When engaged, a rearward movement of the knob end of the lever 343 pushes clutch 329 forwardly and the modified low is obtained. It is to be observed that it is obtained by the same lever movement as is used for normal low but with the latch sleeve raised. The movements of lever 343 for the three forward speeds and reverse are conventional and the modified low is obtained as for ordinary low but with a mere lift on the finger grip.

The transmission of Fig. 12 bears to that of Fig. 9 somewhat the same relation as that of Fig. 6 does that of Fig. 1. In Fig. 6 the normal high is engaged along with the modified high instead of being engaged with the normal high out of operation as in Fig. 1. In Fig. 9 normal low is out of operation when modified low is engaged. In Fig. 12 modified low is engaged simultaneously with normal low.

Referring to Figs. 12 to 14, numeral 401 is the input shaft, 403 is the intermediate shaft driven thereby and piloted thereto as shown. Beyond a shaft bearing 405 is a shaft 407 clamped as at 409 to shaft 403. Another bearing is shown at 411. Input shaft 401 carries a fixed gear 413. Shaft 403 has splined thereto a clutch sleeve 415, splined on which is a driven low speed and reverse gear 417. Countershaft 419 has a gear 421 driven by gear 413, a gear 423 in constant mesh with idler 425 of idler shaft 427 and adapted to be engaged by gear 417. It also has a gear 429 in constant mesh with gear 431 rotatably mounted on shaft 403. Idler 427 has a second gear 430 to be engaged with gear 417 for reverse driving. Beyond bearing 411 is a gear 433 free on shaft 407 but in mesh with gear 435 on shaft 437. On shaft 437 is another gear 439 in constant mesh with gear 441 on output shaft 443. There are three slidable rails. Rail 445 carries with it fork 447 for sliding gear 417 to make shifts to and from low and reverse. Rail 449 as it slides carries fork 451 to reciprocate clutch sleeve 415 to the left to clutch shaft 403 to the input shaft for direct drive or to the right to clutch gear 431 to shaft 403, whereupon shafts 403 and 407 are driven through gear trains 413—421 and 429—431. Rail 453 may be reciprocated to carry fork 455 and with it clutch 457, said clutch in its right end position serving to lock the output shaft to shaft 407 for direct drive therewith. In its other position—to the left—it clutches gear 433 from rotation relative to shaft 407, whereupon by reducing gear trains 433—435 and 439—441 the driven shaft is driven more slowly than shaft 407.

Since it is necessary that gear trains 433—435 and 439—441 may be operative while gear 417 is in mesh with gear 423, the following structure is provided for use with the shift lever 459. A sleeve latch 461 slides on lever 459, being held downwardly by a spring 463. It may be lifted upwardly by a rod 465 as in the other forms already described. The lower end of the lever is operatively associated with rail 445 and fork 447 for shifting into reverse and low speeds when the lever is rocked transversely by moving the knob end toward the left. If the knob end is moved toward the right, a lug 467 on latch 461 may engage the second and high speed rail and fork assembly and fore and aft movements of the lever makes the conventional shifts to second speed and high speed. It will be seen from Fig. 13 that sleeve 461 has another lug 469 adapted to engage a lug 471 on rail 453 simultaneously with the engagement of the lower end of the lever with rail 445 provided the sleeve is drawn up by the rod 465 against the resistance of spring 463. When the sleeve is so raised and the lever shifted transversely to its low speed position, a rearward movement at the knob end of the lever moves clutch 457 forwardly to lock gear 433 to shaft 407 simultaneously with the shifting of gear 417 forwardly to engage gear 423. It will therefore be seen that the conventional lever movements produce the usual shift changes and that when shifting as to low a modified low is obtained by merely lifting the latch prior to shifting from neutral. Accidental movements of the sleeve when lug 469 is not in a position to engage lug 471 are prevented by stop 473 in the housing 475.

In this form of the invention it may be desired to house the supplemental gearing involving gear trains 433—435 and 439—441 within the housing for the wheel shaft differential. Fig. 15 is added to show how this modification may be carried out. Numeral 475 shows a housing for the wheel shaft differential and pinion drive. It is to be assumed that the modified low gear trains are assembled therein together with the equivalent of clutch 457. The latter is to be operated by a suitable fork carried by a shaft 477 projecting from the housing. A shaft arm 479 is then connected by a rod 481 to an arm 483 extending from the end of a lengthened equivalent 485 of the rail 453. It will be seen that the operation of the mechanism is precisely the same as that described in connection with Fig. 12. It will be equally obvious that in the modified high of Fig. 6 the same change may be made and the overgear mechanism housed in the differential casing.

Other developments and minor mechanical changes may be made in the installation of devices in accordance with the above description.

I claim:

In transmission mechanism, input and output shafts, gearing to drive said output shaft from said input shaft at a plurality of driving ratios, at least three reciprocable members for activating said gearing to produce said ratios, each of two of said reciprocating members having two positions of adjustment to effect two driving ratios through said gearing, said third reciprocating member being movable to a position wherein a fifth driving ratio is obtained through said gearing, a shift lever projecting between said reciprocable members in such a way that two of said reciprocable members are on one side of the end of said lever, said two members being vertically spaced and means carried by said lever whereby the one or the other of said spaced members may be operably engaged by the lever when transversely shifted, whereby at least five driving ratios may be obtained from said gearing by two transverse positions of said lever.

PERRY L. TENNEY.